US00RE42640E

(19) United States
(12) Reissued Patent
Kim

(10) Patent Number: US RE42,640 E
(45) Date of Reissued Patent: Aug. 23, 2011

(54) DISPLAY APPARATUS

(75) Inventor: Jin-bog Kim, Hwasung (KR)

(73) Assignee: Samsung Electronics Co., Ltd., Suwon-Si (KR)

(21) Appl. No.: 12/585,248

(22) Filed: Sep. 9, 2009

Related U.S. Patent Documents

Reissue of:
(64) Patent No.: 7,268,829
Issued: Sep. 11, 2007
Appl. No.: 10/833,085
Filed: Apr. 28, 2004

(30) Foreign Application Priority Data

Jul. 31, 2003 (KR) ..... 10-2003-0053252

(51) Int. Cl.
*H04N 9/74* (2006.01)
*G06F 3/14* (2006.01)

(52) U.S. Cl. ..... 348/564; 345/634; 345/764; 345/156

(58) Field of Classification Search ..... 348/564, 348/656, 569, 589, 570, 563, 584, 586; 386/46, 386/52; 345/764, 838, 340; 382/199, 194
See application file for complete search history.

(56) References Cited

U.S. PATENT DOCUMENTS

| | | | | |
|---|---|---|---|---|
| 4,742,387 | A | 5/1988 | Oshima | |
| 4,829,370 | A | 5/1989 | Mayne et al. | |
| 5,638,117 | A | 6/1997 | Engeldrum et al. | |
| 5,852,431 | A * | 12/1998 | Ito | 715/858 |
| 5,978,041 | A | 11/1999 | Masuda et al. | |
| 6,177,937 | B1 * | 1/2001 | Stockham et al. | 715/807 |
| 6,333,752 | B1 * | 12/2001 | Hasegawa et al. | 715/764 |
| 6,606,100 | B1 * | 8/2003 | Lonoce et al. | 345/698 |
| 6,788,812 | B1 * | 9/2004 | Wilkins | 382/167 |
| 6,791,624 | B1 * | 9/2004 | Suga | 348/588 |
| 6,879,326 | B1 * | 4/2005 | Herman | 345/589 |
| 6,885,407 | B1 * | 4/2005 | Lee | 348/569 |
| 7,268,829 | B2 * | 9/2007 | Kim | 348/564 |
| 2003/0086004 | A1 * | 5/2003 | Usami | 348/223.1 |
| 2004/0165113 | A1 * | 8/2004 | Kim et al. | 348/564 |

FOREIGN PATENT DOCUMENTS

| | | |
|---|---|---|
| CN | 1345434 | 11/2000 |
| CN | 1345434 A | 11/2000 |
| JP | 6-253327 | 9/1994 |
| JP | 8-163582 | 6/1996 |
| JP | 10-341358 | 12/1998 |

(Continued)

OTHER PUBLICATIONS

U.S. Appl. No. 10/833,085, filed Apr. 28, 2004, Jin-bog Kim, Samsung Electronics Co., Ltd.

(Continued)

*Primary Examiner* — Paulos M Natnael
(74) *Attorney, Agent, or Firm* — Staas & Halsey LLP

(57) ABSTRACT

A display apparatus including a display to display a picture; a signal processor to format a video signal to be output to the display; and a controller to output a control signal to the signal processor on the basis of a picture display state controlled through a control screen; wherein the picture display state is set by a user through the control screen, which is displayed concurrently with a plurality of reference screens displaying different values of the picture display state.

21 Claims, 2 Drawing Sheets

FOREIGN PATENT DOCUMENTS

| | | |
|---|---|---|
| KR | 1998-4302 | 3/1998 |
| KR | 1998-077273 | 11/1998 |
| KR | 1999-26076 | 4/1999 |
| KR | 1999-74284 | 10/1999 |
| KR | 2002-79348 | 10/2002 |
| KR | 2003-0046942 | 6/2003 |
| KR | 2004-0040587 | 5/2004 |

OTHER PUBLICATIONS

Korean Office Action for 10-2003-0053252.
Korean Office Action issued Jan. 20, 2006.
U.S. Patent Office Action, mailed Oct. 31, 2006, issued in corresponding U.S. Appl. No. 10/833,085.
U.S. Patent Office Action, mailed Aug. 6, 2007, issued in corresponding U.S. Appl. No. 10/833,085.
U.S. Notice of Allowance and Allowability, mailed May 1, 2007, issued in corresponding U.S. Appl. No. 10/833,085.
Chinese Office Action For Related Application, Issued Jun. 9, 2006.
Japanese Publication No. 8-163582, published Jun. 21, 1996, is generally related to "Color Temperature Adjusting Apparatus for Color Brown Tube".
Japanese Publication No. 10-341358, published Dec. 22, 1998, is generally related to "Picture Quality Adjusting System".
Japanese Publication No. 6-253327, published Sep. 9, 1994, is generally related to "Display Apparatus".
Korean Publication No. 2002-79348, published Oct. 19, 2002, is generally related to "User Preferable Color Temperature Converting Method and Apparatus for Image Displaying Device".
Korean Publication No. 1999-26076, published Apr. 15, 1999, is generally related to "Automatic Color Switching and Storing Method for Monitor".
Korean Publication No. 1999-74284, published Oct. 5, 1999, is generally related to "Color Temperature Control Apparatus for Image Displaying Device".
Korean Publication No. 1998-4302, published Mar. 30, 1998, is generally related to "Color Curve Control Circuit and Method".

* cited by examiner

DISPLAY APPARATUS

Matter enclosed in heavy brackets [ ] appears in the original patent but forms no part of this reissue specification; matter printed in italics indicates the additions made by reissue.

CROSS-REFERENCE TO RELATED APPLICATIONS

[This application claims the benefit of Korean Patent Application No. 2003-53252, filed Jul. 31, 2003, in the Korean Intellectual Property Office, the disclosure of which is incorporated herein by reference.]

*This application is a broadening reissue application of U.S. Pat. No. 7,268,829, which claims U.S. application Ser. No. 10/833,085, filed with the U.S. Patent Trademark Office on Apr. 28, 2004 and earlier priority benefit to Korean Patent Application No. 10-2003-0053252 filed with the Korean Intellectual Property Office on Jul. 31, 2003, the disclosures of which are incorporated herein by reference.*

BACKGROUND OF THE INVENTION

1. Field of the Invention

The present invention relates to a display apparatus, and more, particularly, to a display apparatus in which a favorite picture display state is optionally and objectively controlled.

2. Description of the Related Art

Generally, a display apparatus such as a TV, a monitor, etc., has to be controlled in a picture display state showing properties such as color, contrast, brightness, color temperature, etc., so as to substantially display the color temperature, the brightness, etc., of a screen as a user wants.

However, because it takes a significant amount of time to control the color temperature of the display apparatus in detail, the conventional display apparatus typically has two to five settings of the color temperature stored in EEPROM (electrically erasable programmable read only memory) on a production line, so that a user can select one among the two to five settings of the color temperature stored in the EEPROM when there is a need to control the color of a screen.

Therefore, the color temperature of the conventional display apparatus is simply selected among the plurality of settings of the color temperature set up on the production line, and cannot be voluntarily controlled as a user wants.

Meanwhile, the color temperature of the display apparatus is typically controlled through control buttons provided on the display apparatus or a separate device. Generally, when a selection button among the control buttons is pressed, the color temperature corresponding to the selection button is directly applied to a current displayed screen. Then, when a setup button among the control buttons is pressed, the color temperature being applied to the current displayed screen is set up as the color temperature for the display device.

When displaying the selected color temperature setting, the screen applied with the selected color temperature is displayed in a full screen, so that there is no reference screen allowing a user to objectively distinguish the currently viewed color temperature from the other possible color temperature settings.

Therefore, a user cannot objectively control the color temperature as desired.

SUMMARY OF THE INVENTION

Accordingly, it is an aspect of the present invention to provide a display apparatus in which a favorite picture display state is optionally and objectively controlled referring to a reference screen.

Additional aspects and/or advantages of the invention will be set forth in part in the description which follows and, in part, will be obvious from the description, or may be learned by practice of the invention.

The foregoing and/or other aspects of the present invention are achieved by providing a display apparatus comprising a display to display a picture; a signal processor to format a video signal to be output to the display; and a controller to output a control signal to the signal processor on the basis of a picture display state controlled through a control screen; wherein the picture display state is set by a user through the control screen, which is displayed concurrently with a plurality of reference screens displaying different values of the picture display state.

According to an aspect of the invention, the control screen may comprise a drag bar having an adjuster, and the picture display state is controlled by dragging the adjuster on the drag bar.

According to an aspect of the invention, the display apparatus may further comprise a user control with which the user controls the picture display state.

According to an aspect of the invention, the picture display state may be a color temperature.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
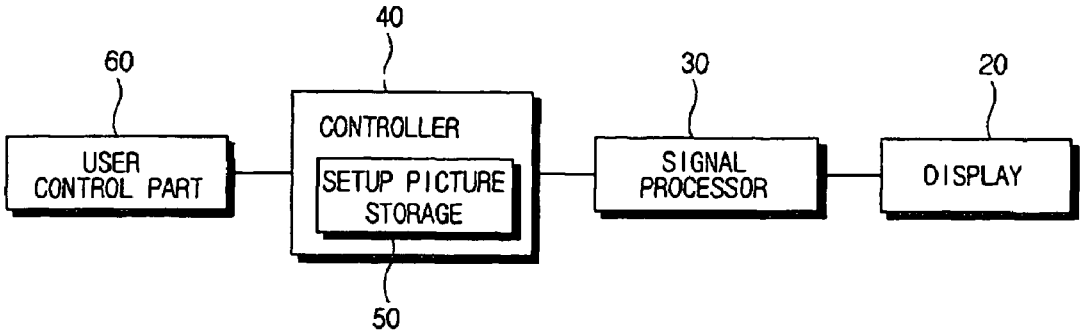
FIG. 1 is a control block diagram of a display apparatus according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a control block diagram of a display apparatus according to an embodiment of the present invention. As shown therein, this display apparatus comprises a display 20 on which a picture is displayed; a signal processor 30 formatting a video signal to be displayed on the display 20; and a controller 40 offering a control screen allowing a user to set up a picture display state and a plurality of reference screens employed as a reference when the picture display state is controlled, and outputting a control signal to the signal processor 30 on the basis of the picture display state controlled through the control screen.

Further, the display apparatus comprises a user control 60 allowing a user to control the picture display state.

The signal processor 30 includes a video decoder to process an ordinary video signal, an ADC (analog to digital converter) to process a digital video signal, and a scaler to adapt the video signal processed by the video decoder and the ADC to the display 20.

The video decoder receives a video signal such as NTSC (national television standard committee)—TV, VHS (video home system)—video, etc., and separates the video signal into a Y component, as a brightness signal, and R-Y and B-Y components as chrominance signals. Here, the R-Y and B-Y components are converted into RGB (red, green, blue) signals for color. Hereinafter, the brightness signal (Y) and the chrominance signals (R-Y and B-Y), output from the video decoder, will be represented as a YCbCr signal.

The ADC is employed to process a video signal for a DVD (digital versatile disk) or an HDTV (high definition television), and outputs a video signal including the brightness signal (Y) and the chrominance signals (R-Y and B-Y). Hereinafter, the brightness signal (Y) and the chrominance signals (R-Y and B-Y), output from the ADC, will be represented as a YPbPr signal.

The scaler adapts the YCbCr and YPbPr signals to a vertical frequency, resolution (the number of pixels), a screen ratio (16:9, 4:3), etc., of the display 20, and, at the same time, converts the YCbCr and YPbPr signals into a digital RGB signal by calculating the YCbCr and YPbPr signals through a computing mechanism according to the signal formats.

The controller 40 offers a control screen allowing a user to set up the picture display state, and the plurality of reference screens employed as a reference when the picture display state is controlled.

The control screen and the plurality of reference screens are previously stored in a setup screen storage 50 of the controller 40. Here, the setup screen storage 50 includes an EEPROM or a flash memory.

Figure 2:
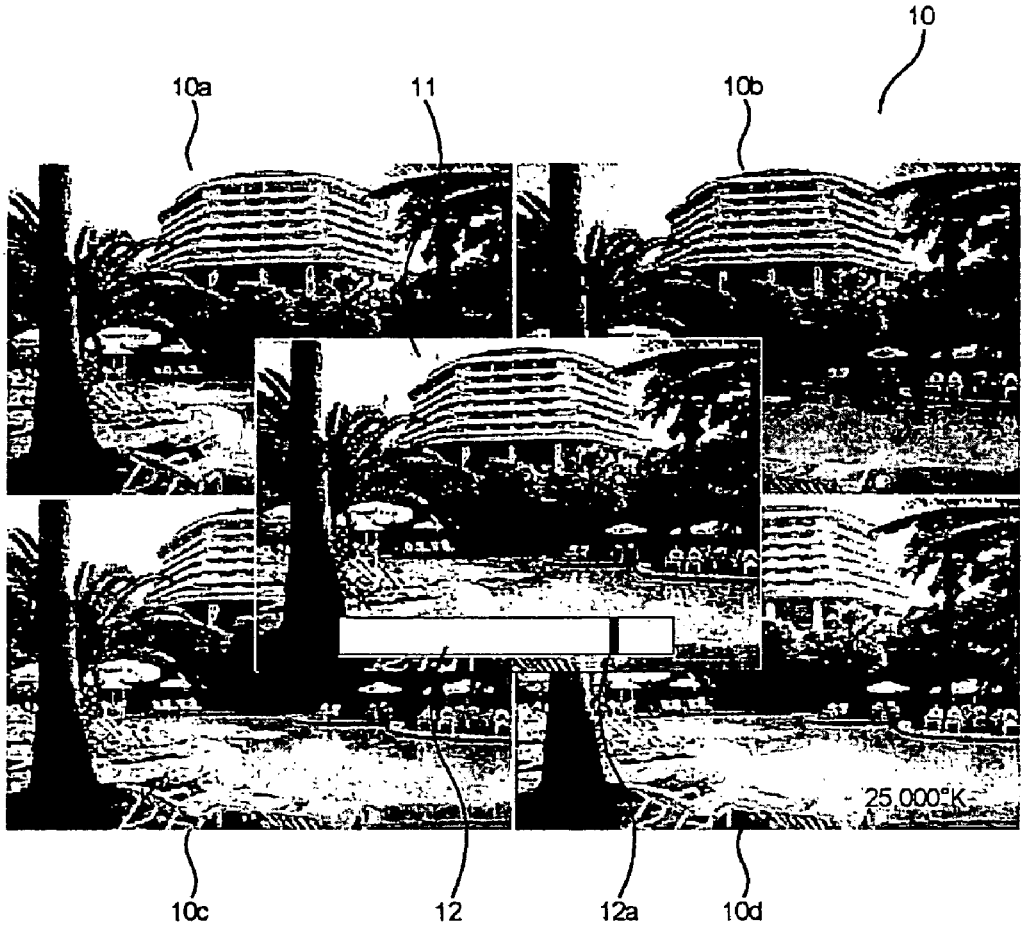
FIG. 2 illustrates a reference screen and a control screen.

As shown in FIG. 2, a setup screen 10 allowing a user to change a color temperature in a screen is displayed on the display 20, including the reference screens 10a through 10d and the control screen 11.

Here, the reference screens 10a through 10d are invariable screens applied with predetermined color temperatures, and the control screen 11 is a variable screen varying in the color temperature corresponding to the selection of the user.

It is preferable, though not necessary, that the reference screens 10a through 10d and the control screen 11 have pictures allowing the user to easily distinguish a difference in the color temperature. A landscape, a man, a building, gradation, and the like are a few suitable possibilities for the pictures of the reference screens 10a through 10d and the control screen 11. Further, the pictures are provided corresponding to each of the possible color temperature settings.

In this embodiment, four invariable screens 10a, 10b, 10c, and 10d, with respective color temperatures of 6,500° K, 9,500° K, 13,000° K, and 25,000° K. are illustrated as the refer screens. This is merely an example of possible reference screens, and is not intended to limit this embodiment of the present invention to these values. Alternately, the number of the reference screens may be more or less than four.

The plurality of reference screens allows a user to objectively distinguish a favorite color temperature from among the possible color temperature settings when a user wants to set up the color temperature.

Here, the invariable screens preferably have all the same pictures to allow a user to distinguish the difference in the color temperature, but the invariable screens may have different pictures from each other. Also, it should be appreciated that the reference screens 10a through 10d may have a different picture than the control screen 11.

The controller 40 (refer to FIG. 1) outputs the control signal to the signal processor 30 on the basis of the picture display state controlled through the control screen 11.

The control screen 11 may include a drag bar 12 having an adjuster 12a capable of being dragged. Here, the drag bar 12 represents the whole color temperature that the display apparatus according to this embodiment of the present invention can display. In this embodiment, the color temperature ranges from 6,000K to 30,000° K.

As the adjuster 12a of the drag bar 12 is dragged, the control screen 11 is changed to the color temperature corresponding to the position of the adjuster 12a on the drag bar 12.

That is, when a user makes the setup screen 10 be displayed on the display 20 in order to control the color temperature, the controller 40 determines where the adjuster 12a is positioned on the drag bar 12. Subsequently, the controller 40 outputs the control signal to the signal processor 30 on the basis of the controlled color temperature corresponding to the position of the adjuster 12a, and then the signal processor 30 applies the controlled color temperature to only the control screen 11 of the display 20.

Further, when a user sets up the controlled color temperature as the color temperature for the display device by using a predetermined setup button, the controller 40 receives a setup signal corresponding to the setup button. Subsequently, the controller 40 outputs the control signal corresponding to the controlled color temperature applied to only the control screen 11 to the signal processor 30. Then, the signal processor 30 applies the setup color temperature being applied to only the control screen 11 to the video signal for a full screen of the display 20.

Here, the controlled color temperature being applied to only the control screen 11 may be temporarily stored in a memory (not shown) provided in the controller 40 while being controlled. The controlled color temperature stored in the memory can be read and outputted to the signal processor 30 while being set up.

Further, to get more enhanced definition, the color temperature can be controlled through a lookup table having control factors such as an RGB gamma value, a color tone, a gain, a cut-off, brightness, etc., according to the color temperature.

In this case, the signal processor 30 can make the setup color temperature be not applied to a video signal that is irrelevant to the color temperature, e.g., a video signal corresponding to a skin tone or RGB primary colors.

The user control 60 may include a user interface having a function key to display the setup screen 10 on the display 20, and a drag key to drag the adjuster 12a on the control screen 11.

Further, the user control 60 is preferably, though not necessarily, achieved by an OSD (on screen display) button provided on the display apparatus, or a remote control.

The OSD button or the remote control has the function keys to stop displaying a picture based on a received video signal on the display 20 and to display the previously stored setup screen 10 so as to allow a user to set up the color temperature. Further, the drag key to control the color temperature can be implemented by existing direction keys.

In this embodiment, the color temperature is exemplarily described as the picture display state, but the embodiment is not limited to color temperature. Alternatively, any controllable picture display state, such as color, contrast, brightness, etc., can be set up with reference to the reference screens according to the picture display states as described above.

With this configuration, a user can optionally and objectively set up a favorite picture display with reference to the reference screens.

As described above, the present invention provides a display apparatus in which a favorite screen display state is optionally and objectively controlled referring to a reference screen.

Although a few embodiments of the present invention have been shown and described, it would be appreciated by those skilled in the art that changes may be made in these embodiment without departing from the principles and spirit of the invention, the scope of which is defined in the claims and their equivalents.

What is claimed is:

1. A display apparatus comprising:

a display to display a picture;

a signal processor to format a video signal to be output to the display; and a controller to output a control signal to the signal processor on the basis of a picture display state controlled through a control screen;

wherein the picture display state is set by a user through the control screen, which is displayed concurrently with a plurality of reference screens displaying different values of the picture display state, wherein the reference screens are invariable screens displaying different values of the picture display state, and the control screen is a variable screen varying according to manipulation by the user.

2. The display apparatus according to claim 1, wherein the control screen comprises a drag bar having an adjuster, and the picture display state is controlled by dragging the adjuster on the drag bar.

3. The display apparatus according to claim 2, wherein the drag bar is controlled by existing direction keys on a remote control or the display.

4. The display apparatus according to claim 1, further comprising a user control with which the user controls the picture display state.

5. The display apparatus according to claim 4, wherein the user control comprises an OSD button or a remote controller.

6. The display apparatus according to claim 5, wherein the user control comprises a user interface having a function key to display a setup screen on the display.

7. The display apparatus according to claim 5, wherein the user control comprises function keys to stop displaying the picture on the display, and to display a previously stored setup screen.

8. The display apparatus according to claim 1, wherein the picture display state is a color temperature.

9. The display apparatus according to claim 8, further comprising a lookup table comprising at least one of control factors including an RGB gamma value, a color tone, a gain, a cut-off, and brightness, wherein the controller uses the lookup table to form the control signal.

10. The display apparatus according to claim 1, wherein the controller comprises a setup screen storage, and the control screen and the plurality of reference screens are previously stored in the setup screen storage.

11. The display apparatus according to claim 10, wherein the setup screen storage comprises an EEPROM or a flash memory.

12. The display apparatus according to claim 1, wherein the reference screens comprise pictures such that the user easily distinguishes the different values of the picture display state.

13. The display apparatus according to claim 1, wherein the reference screens are provided corresponding to each of the possible different values of the picture display state.

14. The display apparatus according to claim 1, wherein each of the reference screens displays different picture display state values of a same picture.

15. The display apparatus according to claim 1, wherein the picture display state is color, contrast, or brightness.

16. A display apparatus comprising:

a display; and a controller to control a picture display state of a picture displayed on the display based on a user input;

wherein a [setup] *control* screen is displayed concurrently with a plurality of reference screens displaying different values of the picture display state, so that the user sees the different values of the picture display state that are available, wherein the reference screens are invariable screens displaying different values of the picture display state, and the control screen is a variable screen varying according to manipulation by the user.

*17. A display apparatus comprising:*

*a display which displays a control screen and a plurality of reference screens; and*

*a controller which changes a picture display state of the control screen based on a user input, controls the display to display an adjuster which indicates a current value of the picture state,*

*wherein the control screen is displayed concurrently with the plurality of reference screens, and each reference screen is invariable and each reference screen displays the picture according to a different reference value of the property of the picture.*

*18. The display apparatus according to claim 17, wherein the adjuster includes a control bar which shows a range corresponding to values which can be selected by a user.*

*19. A display apparatus comprising:*

*a display which displays a control screen and a plurality of reference screens; and*

*a controller which receives from a user control part an input for controlling a picture display state, controls the control screen to display a picture according to received input for controlling the picture display state, controls the display to display the control screen concurrently with the plurality of reference screens, and controls each reference screen to display the picture according to a different reference value of the property of the picture,*

*wherein the displaying of the picture in each reference screen is invariable and uncontrollable by the user's control, and*

*wherein the displaying of the picture in the control screen is variable according to the user's control.*

*20. The display apparatus according to claim 19, wherein the display displays an adjuster.*

*21. The display apparatus according to claim 20, wherein the display displays the adjuster based on the received input for controlling the picture display state.*

* * * * *